(12) United States Patent
Goff et al.

(10) Patent No.: US 10,875,968 B2
(45) Date of Patent: Dec. 29, 2020

(54) HYDRIDOSILOXANYL SUBSTITUTED CYCLOTRISILOXANES, PREPARATION METHOD THEREOF, AND POLYMERIC PRODUCTS DERIVED THEREFROM

(71) Applicant: Gelest Technologies, Inc., Morrisville, PA (US)

(72) Inventors: Jonathan D. Goff, Philadelphia, PA (US); Barry C. Arkles, Pipersville, PA (US)

(73) Assignee: GELEST TECHNOLOGIES, INC., Morrisville, PA (US)

( * ) Notice: Subject to any disclaimer, the term of this patent is extended or adjusted under 35 U.S.C. 154(b) by 141 days.

(21) Appl. No.: 16/375,239

(22) Filed: Apr. 4, 2019

(65) Prior Publication Data

US 2019/0315929 A1    Oct. 17, 2019

Related U.S. Application Data

(60) Provisional application No. 62/658,706, filed on Apr. 17, 2018.

(51) Int. Cl.
| | |
|---|---|
| *C08G 77/12* | (2006.01) |
| *C08G 77/50* | (2006.01) |
| *C07F 19/00* | (2006.01) |
| *C08G 77/00* | (2006.01) |
| *C07F 7/21* | (2006.01) |

(52) U.S. Cl.
CPC .............. *C08G 77/50* (2013.01); *C07F 19/00* (2013.01); *C07F 7/21* (2013.01); *C08G 77/12* (2013.01); *C08G 77/70* (2013.01)

(58) Field of Classification Search
CPC ............ C07F 7/12; C08G 77/50; C08G 77/12
See application file for complete search history.

(56) References Cited

U.S. PATENT DOCUMENTS

| | | | | |
|---|---|---|---|---|
| 5,557,000 A | * | 9/1996 | Minemura ................ | C07F 7/21 556/434 |
| 6,005,131 A | * | 12/1999 | Jentsch ................ | C07F 7/0879 556/434 |
| 6,284,906 B1 | * | 9/2001 | Paulasaari ................ | C07F 7/21 556/451 |
| 10,669,294 B2 | * | 6/2020 | Goff ........................ | C08K 5/06 |
| 2006/0106187 A1 | * | 5/2006 | Kennedy .................. | C07F 7/21 528/33 |
| 2006/0116500 A1 | * | 6/2006 | Chapman ............... | C08G 77/50 528/15 |

FOREIGN PATENT DOCUMENTS

WO         0127187 A1    4/2001

OTHER PUBLICATIONS

Metal Complex Catalyzed Hydrosilylation of Vinyl with Hydrosiloxanes (A review), D.A. De Vekki eta l. http://science.spb.ru/files/BulletinIT/20 13/1/Articles/20/files/assets/downloads/publication.pdf (Year: 2013).*
Frye et al., "Reactions of Organolithium Reagents with Siloxane Substrates," The Journal of Organic Chemistry, vol. 35, No. 5, pp. 1308-1314 (May 1970).
Goff et al., "Living Polymerization Routes to Siloxane Macromers and Higher Order Silicone Structures," Progress in Silicones and Silicone-Modified Materials, Ed S. Clarson, Chapter 5, pp. 59-78 (2013).
Cai et al., "Preparation and reactivity of polyfunctional six- and eight-membered cyclic silicates," Journal of Organometallic Chemistry, vol. 689, No. 3, pp. 689-693 (Feb. 9, 2004).
International Search Report and Written Opinion dated Jun. 27, 2019 in International Application PCT/US2019/025769.
Sargent et al., "Telechelic 4 and 6 Branch Star Siloxanes by Acid Catalyzed Incorporation of D4 Units into the Si-0-Si Bonds of Tetra(dimethylsiloxy)silane and Hexa(dimethylsiloxy)cyclotrisiloxane," Polymer Preprints (American Chemical Society, Division of Polymer Chemistry), vol. 41, No. 1, pp. 604-605 (2000).
Scibiorek et al., "Controlled Synthesis of Amphiphilic Siloxane-Siloxane Block Copolymers with Carboxyl Functions," Polymer Bulletin, vol. 44, No. 4, pp. 377-384 (May 1, 2000).
Weber et al., "Synthesis and Properties of Poly(Siloxanes) with Novel Architectures," Polymer Preprints, American Chemical Society, US, vol. 41, No. 1, pp. 562-563 (Jan. 1, 2000).

* cited by examiner

*Primary Examiner* — Margaret G Moore
(74) *Attorney, Agent, or Firm* — Panitch Schwarze Belisario & Nadel LLP

(57) ABSTRACT

A new class of cyclotrisiloxanes having hydridosiloxanyl-alkyl substituents on one, two, or three of the ring silicon atoms and a method for their preparation are provided. These compounds undergo living anionic ring-opening polymerization to generate unique polymer structures.

15 Claims, No Drawings

HYDRIDOSILOXANYL SUBSTITUTED CYCLOTRISILOXANES, PREPARATION METHOD THEREOF, AND POLYMERIC PRODUCTS DERIVED THEREFROM

CROSS-REFERENCE TO RELATED APPLICATION

This application claims priority to U.S. Provisional Patent Application No. 62/658,706, filed Apr. 17, 2018, the disclosure of which is herein incorporated by reference in its entirety.

BACKGROUND OF THE INVENTION

Cyclic trisiloxanes or cyclotrisiloxanes can be generally described as ring structures containing six atoms in which three silicon atoms alternate with three oxygen atoms. These compounds are readily differentiated from higher cyclic siloxanes by the fact that they possess appreciable ring strain. Specifically, the nominal ring strain for hexamethylcyclotrisiloxane has been calculated as ~2.5 kcal/mole, compared to ~0.24 kcal/mole for octamethylcyclotetrasiloxane. This difference facilitates a number of ring-opening reactions. Of particular importance is the ability of cyclotrisiloxanes to undergo living AROP (anionic ring-opening polymerization), see C. Frye, *J. Org. Chem.*, 35, 1308; (1970); J. Goff et al., "Living Polymerization Routes to Siloxane Macromers and Higher Order Silicone Structures," *Progress in Silicones and Silicone-Modified Materials*, S. Clarson, Ed., Chapter 5, 59-78 (2013).

The ability to control precise functionality, particularly at high molecular weights, is a primary benefit of living anionic polymerizations. It is generally recognized that kinetically driven AROP provides better structural control than equilibrium polymerization and is less subject to substituent effects (substitutions on the silicon atoms) that affect equilibrium. It is of great interest in silicone polymer chemistry to introduce hydrides (hydrogen atoms) onto the silicon atoms of the polymer backbone. The hydrides can act as sites for derivatization and crosslinking of silicone polymers. In the area of living anionic polymerizations, the practical ability to introduce hydrides in positions other than on the terminal silicon atoms has been limited by the relative unavailability of cyclotrisiloxanes such as trimethylcyclotrisiloxane. While trimethylcyclotrisiloxane is known, at this time there are no commercial sources for this compound and a practical synthesis has not been reported. Thus, there is a need for a process for preparing strained cyclic siloxane systems containing silicon hydrides.

SUMMARY OF THE INVENTION

The invention relates to a cyclotrisiloxane in which one, two, or three of the ring silicon atoms has a hydridosiloxanylalkyl substituent, wherein the alkyl group has about 2 to 8 carbon atoms.

The invention also relates to a method of preparing a cyclotrisiloxane in which one, two, or three of the ring silicon atoms has a hydridosiloxanylalkyl substituent, the method comprising reacting a vinyl-substituted cyclotrisiloxane with a dihydride functional siloxane.

DETAILED DESCRIPTION OF THE INVENTION

The present invention is directed to a new class of chemical compounds which are ring-strained cyclotrisiloxanes having one, two, or three hydridosiloxanylalkyl substitutions on the ring silicons, also known as hydridosiloxanylalkylcyclotrisiloxanes. Most preferably, the alkyl group is an ethyl group and the compounds have one, two, or three hydridosiloxanylethyl substitutions on the ring silicons. The remaining ring silicon atoms have alkyl or aryl substituents, preferably combinations of methyl, ethyl, and phenyl substituents. Most preferably, all of the non-hydridosiloxanylalkyl substituents on the ring silicon atoms are methyl groups.

An exemplary compound of this class having three hydridosiloxanylethyl substitutions is 1,3,5-[tris(tetramethyldisiloxanyl)ethyl]-1,3,5-trimethylcyclotrisiloxane, which has formula (1) shown below.

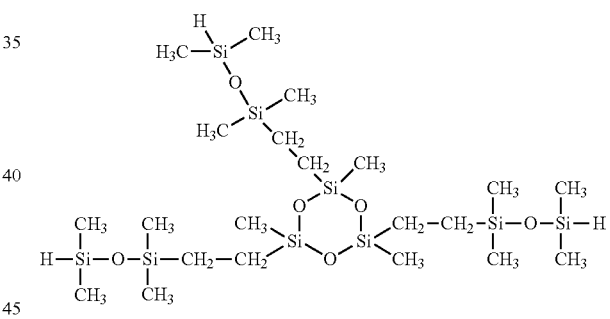

(1)

Another exemplary compound which also has three hydridosiloxanylethyl substitutions is 1,3,5-[tris(hexamethyltrisiloxanyl)ethyl]-1,3,5-trimethylcyclotrisiloxane, which has formula (2). An exemplary cyclotrisiloxane having one hydridosiloxanylethyl substitution, [(tetramethyldisiloxanyl)ethyl]pentamethylcyclotrisiloxane, has formula (3).

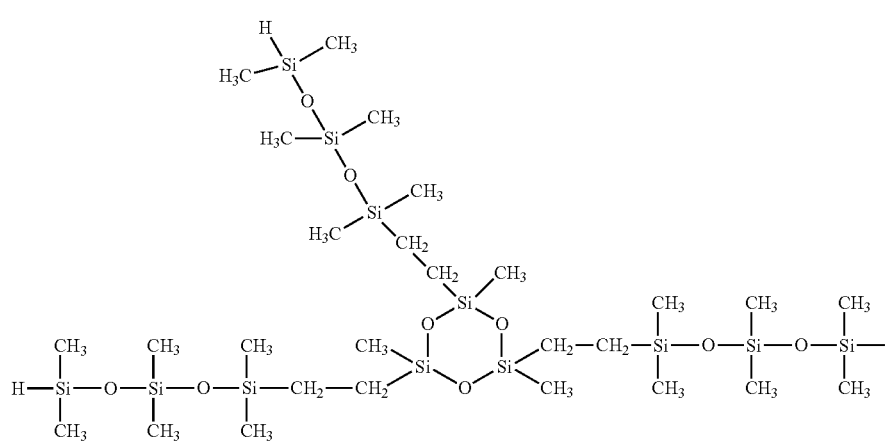

(2)

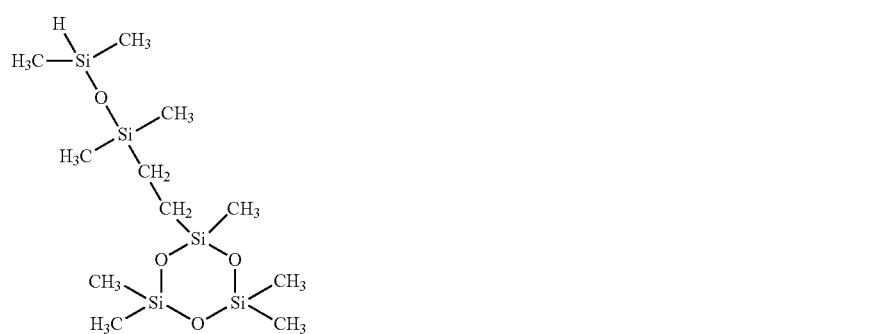

(3)

The siloxanylethyl substituents on the cyclictrisiloxanes according to the invention have general formula (4):

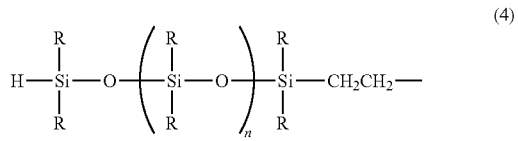

(4)

In formula (4), R is an alkyl group having about 1 to 4 carbon atoms, and n is an integer of 0 or greater. Most preferably, R is a methyl group and n is 0 (disiloxanylethyl) or 1 (trisiloxanylethyl).

It is also within the scope of the invention to utilize the more general siloxanylalkyl substituents, in which the alkyl group is other than ethyl, such as alkyl groups having 3 to 8 or more carbon atoms, as shown in formula (5). In formula (5), n is an integer of 0 or greater, R is an alkyl group having 1 to about 4 carbon atoms, and R' is an alkyl group having 2 to 8 methylene units. For example, when the alkyl group has 3 carbon atoms (3 methylene groups), the substituent would be a siloxanylpropyl group.

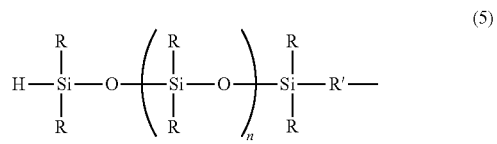

(5)

The cyclotrisiloxanes of the invention undergo living anionic ring-opening polymerization, generating unique polymer structures. As understood in the art, an initiator, typically an alkyl lithium or lithium silanolate, generates an alpha-terminus which can be a simple alkyl substituent, most commonly methyl or n-butyl, but may range to a variety of substituted groups such as, but not limited to, vinyl, hydride, fluorinated alkyl such as trifluoropropyl, alkoxy(polyalkyleneoxy)alkyl such as methoxy(polyethylenoxy)propyl having about 2 to 10 ethylenoxy groups, and alkoxyalkyl such as methoxyethoxypropyl. The omega-terminus is generated by an end-capper, most commonly a functional group such as, for example, a methacryloxyalkyl, acrylamidoalkyl, acryloxyalkyl, methacrylaminoalkyl, hydridoalkylsiloxy, vinyl, aminoalkyl, carbinol, and chlorodialkylsiloxy group, more specifically, without limitation, a methacryloxypropyl, acrylamidopropyl, acryloxypropyl, methacrylamidopropyl, hydridodimethylsiloxy, or chlorodimethylsiloxy group.

In addition to varying terminal groups, the polymers which may be produced from the cyclotrisiloxanes according to the invention may be differentiated by their structural backbone and may be divided into three main classes. These classes are not meant to limit the invention and other permutations and combinations that would be envisioned by those skilled in the art are also within the scope of the invention.

In the first and simplest class, a homopolymer backbone is formed by the living anionic polymerization of a cyclotrisiloxane in which all silicon atoms of the cyclotrisiloxane have identical substituents. 1,3,5-[tris(tetramethyldisiloxanyl)ethyl]-1,3,5-trimethylcyclotrisiloxane is an example of such a monomer, as shown in formula (1) above.

For example, the compound having formula (6) below, monomethacryloxypropyl, monotrimethyl terminated poly

[(tetramethyldisiloxanyl)ethyl]methylsiloxane, is a polymerization product of 1,3,5-[tris(tetramethyldisiloxanyl)ethyl]-1,3,5-trimethylcyclotrisiloxane monomer.

(6)

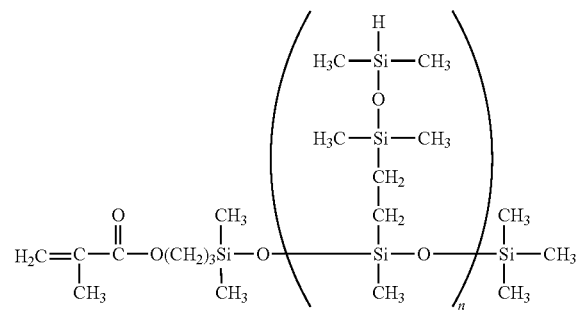

In a second class, block polymers are formed by alternating the polymerization of a cyclotrisiloxane in which all silicon atoms of the cyclotrisiloxane have identical substituents with a second cyclotrisiloxane, for example hexamethylcyclotrisiloxane or tris(trifluoropropyl)methylcyclotrisiloxane, forming block copolymers.

In the third class, regularly alternating copolymers are formed by utilizing a cyclotrisiloxane in which one of the silicon atoms has different substituents than the other two silicon atoms. [(Tetramethyldisiloxanyl)ethyl]pentamethylcyclotrisiloxane (formula (3)) is an example of such a monomer. As previously explained, other combinations and permutations are possible, such as generating terpolymers by utilizing additional monomers or forming hybrid structures by using the cyclotrisiloxanes of the third class in combination with a second trisiloxane to form mixed alternating-block copolymers.

The hydridosiloxanylalkylcyclotrisiloxanes according to the invention may be prepared by reacting cyclotrisiloxanes containing vinyl substitutions on one or more silicon atoms with an excess of a dihydride functional siloxane, such as a disiloxane or a trisiloxane. A simple example is the platinum catalyzed reaction of vinylpentamethylcyclotrisiloxane with an excess of tetramethyldisiloxane, as depicted below in Scheme 1.

Scheme 1

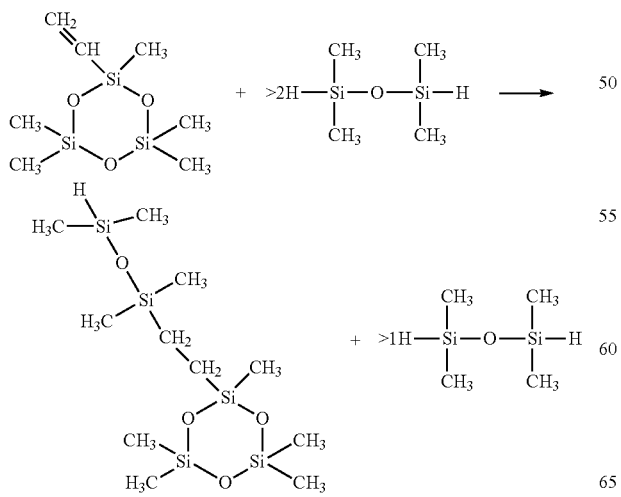

An excess of disiloxane is preferred because it limits disubstitution, and the excess disiloxane is readily recycled. This reaction is general and is not, in principle, limited to cyclotrisiloxanes containing only methyl, ethyl, and vinyl group substitutions on the silicon atoms of the cyclotrisiloxanes.

The invention will now be described in connection with the following, non-limiting examples.

Example 1

Synthesis of 1,3,5-[tris(tetramethyldisiloxanyl)ethyl]-1,3,5-trimethylcyclotrisiloxane (1)

A 5-L 4-necked flask equipped with an overhead stirrer, pot thermometer, reflux condenser, water bath, and addition funnel was blanketed with nitrogen and charged with 2.11 kg (15.7 moles) of tetramethyldisiloxane. The flask was heated to 55° C. and 676 g (2.6 moles) of trivinyltrimethylcyclotrisiloxane were added dropwise at an appropriate rate to maintain the reaction temperature around 60° C. The mixture was stirred for one hour, after which no vinyl groups were observed in $^1$H-NMR. The pot was then stripped at 125° C./0.3 mmHg. The resulting oil was passed through a wiped-film evaporator at 175° C./0.1 mmHg to collect the distillate (1402 g), which had a density of 0.933 g/mL, a viscosity of 14.6 cSt, and a refractive index of 1.430. (Calculated MW for $C_{21}H_{60}O_6Si_9$=661.47).

Example 2

Synthesis of 1,3,5-[tris(hexamethyltrisiloxanyl)ethyl]-1,3,5-trimethylcyclotrisiloxane (2)

A 500-mL 3-necked flask equipped with an overhead stirrer, pot thermometer, reflux condenser, water bath, and addition funnel was blanketed with nitrogen and charged with 121.2 g (0.58 moles) of 1,1,3,3,5,5-hexamethyltrisiloxane. The flask was heated to 70° C. and 0.08 g (10 ppm Pt) of Karstedt's catalyst was added. 25 g (0.1 moles) of trivinyltrimethylcyclotrisiloxane was then added dropwise at an appropriate rate to maintain the reaction temperature around 85° C. The mixture was stirred for 30 minutes, after which no vinyl groups were observed in $^1$H-NMR and the pot was then stripped at 120° C./5 mmHg. The resulting oil had a density of 0.941 g/mL and a viscosity of 18.4 cSt. (Calculated MW for $C_{27}H_{78}O_9Si_{12}$=883.94).

Example 3

Synthesis of [(tetramethyldisiloxanyl)ethyl]pentamethylcyclotrisiloxane (3)

Conditions and stoichiometries are similar to Example 1. (Calculated MW for $C_{11}H_{32}O_4Si_5$=368.80).

Example 4

Synthesis of Monomethacryloxypropyl Terminated poly[(tetramethyldisiloxanyl)ethyl]methylsiloxane A 5-L 4-necked flask equipped with an overhead stirrer, pot thermometer, reflux condenser, water bath, and addition funnel was blanketed with nitrogen and charged with 422 g (0.64 moles) of 1,3,5-[tris(tetramethyldisiloxanyl)ethyl]-1,3,5-trimethylcyclotrisiloxane (prepared in Example 1) and 290 g of hexane and then sparged with nitrogen for 60 minutes. The reaction mixture was cooled to 0° C. with an ice-water cooling bath. Methyl lithium (50 ml of 3.2 M in dimethoxyethane solution) was added to the reaction mixture via an addition funnel over 10 minutes. Ice was added to the cooling bath during the methyl lithium addition to control the exotherm and to maintain the pot temperature below 5° C. The cooling bath was then removed and the temperature of the reaction mixture was allowed to return to 20° C. Subsequently, 61 g of dimethylformamide (DMF) was rapidly added to the pot and the reaction mixture was stirred for 5 hours.

The capping reaction was accomplished by the addition of 34.6 g (0.16 moles) of 3-methacryloxypropyldimethylchlorosilane over 15 minutes, during which time an exotherm was observed. The mixture changed from clear to cloudy and was stirred for an additional 16 hours. Water (200 g) was added to the reaction mixture with stirring and agitated for 90 minutes. The contents of the flask were separated into aqueous and non-aqueous layers in a separatory funnel. The aqueous layer was discarded and the organic phase was washed once with deionized water, once with 5% sodium bicarbonate solution, and once more with deionized water. The last water wash contacting the organic phase remained neutral (pH 7-8). The organic layer was dried over anhydrous sodium sulfate, filtered, and stripped under 5 mm Hg vacuum to a maximum pot temperature of 100° C. The resulting oil (403 g) had a density of 0.99 g/ml and a viscosity of 37.1 cSt. GPC data (polystyrene standard without correlation): Mn: 1280; Mw/Mn: 2.30.

It will be appreciated by those skilled in the art that changes could be made to the embodiment described above without departing from the broad inventive concepts thereof. Also, based on this disclosure, a person of ordinary skill in the art would further recognize that the relative proportions of the components illustrated above could be varied without departing from the spirit and scope of the invention. It is understood, therefor, that this invention is not limited to that particular embodiment disclosed, but it is intended to cover modifications within the spirit and scope of the present invention as defined by the appended claims.

We claim:

1. A cyclotrisiloxane wherein one, two, or three of the ring silicon atoms has a hydridosiloxanylalkyl substituent, wherein the alkyl group has about 2 to 8 carbon atoms.

2. The cyclotrisiloxane according to claim 1, wherein at least one of the hydridosiloxanylalkyl substituents is hydridosiloxanylethyl.

3. The cyclotrisiloxane according to claim 2, having formula (1):

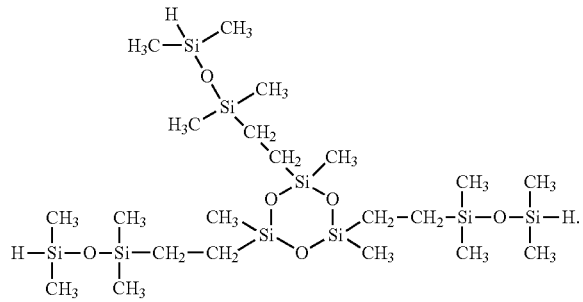

4. The cyclotrisiloxane according to claim 2, having formula (2):

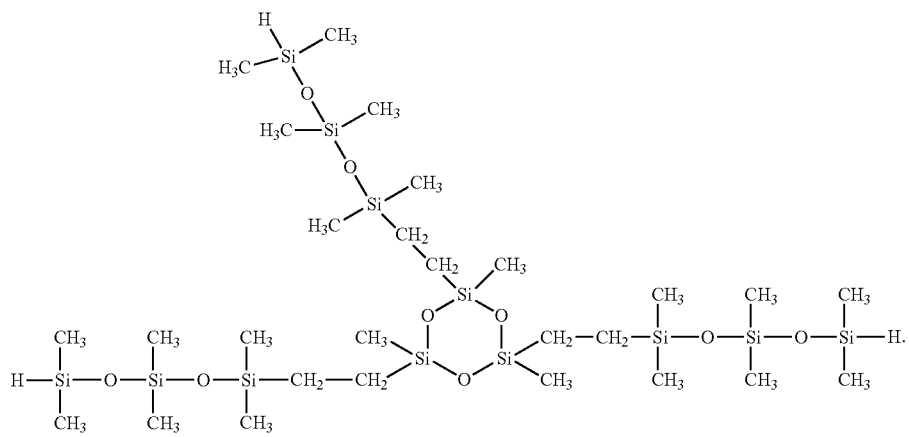

5. The cyclotrisiloxane according to claim 2, having formula (3):

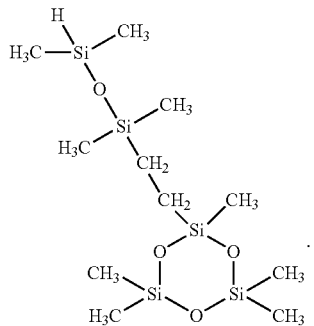

6. The cyclotrisiloxane according to claim 1, wherein at least one of the hydridosiloxanylalkyl substituents has formula (5):

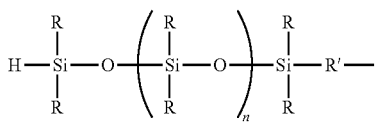 (5)

wherein R is an alkyl group having 1 to about 4 carbon atoms, n is an integer of 0 or greater, and R' is an alkyl group having 2 to about 8 methylene units.

7. The cyclotrisiloxane according to claim 6, wherein R is methyl, R' is —CH$_2$CH$_2$— and n is 0 or 1.

8. The cyclotrisiloxane according to claim 1, wherein the cyclotrisiloxane has two or three hydridosiloxanylalkyl substituents, and wherein the two or three hydridosiloxanylalkyl substituents may be the same or different.

9. A method of preparing a cyclotrisiloxane wherein one, two, or three of the ring silicon atoms has a hydridosiloxanylalkyl substituent, the method comprising reacting a vinyl-substituted cyclotrisiloxane with a dihydride functional siloxane.

10. The method according to claim 9, wherein the dihydride functional siloxane is a disiloxane or a trisiloxane.

11. A polymer formed from the living anionic ring opening polymerization of a cyclotrisiloxane according to claim 1.

12. The polymer according to claim 11, wherein the polymer has an alpha terminus selected from the group consisting of alkyl, vinyl, hydride, fluorinated alkyl, alkoxyalkyl, and alkoxy(polyalkylenoxy)alkyl.

13. The polymer according to claim 11, wherein the polymer has an omega terminus selected from the group consisting of methacryloxyalkyl, acrylamidoalkyl, acryloxyalkyl, methacrylaminoalkyl, hydridoalkylsiloxy, vinyl, aminoalkyl, carbinol, and chlorodialkylsiloxy.

14. A block copolymer formed from the living anionic ring opening polymerization of a cyclotrisiloxane according to claim 1 and a second cyclotrisiloxane.

15. The block copolymer according to claim 14, wherein the second cyclotrisiloxane is hexamethylcyclotrisiloxane or tris(trifluoropropyl)methylcyclotrisiloxane.

* * * * *